(12) United States Patent
Graybill et al.

(10) Patent No.: US 9,958,870 B1
(45) Date of Patent: May 1, 2018

(54) ENVIRONMENTAL CONDITION IDENTIFICATION ASSISTANCE FOR AUTONOMOUS VEHICLES

(71) Applicant: Amazon Technologies, Inc., Seattle, WA (US)

(72) Inventors: Jules Cook Graybill, Seattle, WA (US); Erik Resch Parker, Snohomish, WA (US); Marshall Friend Tappen, Bainbridge Island, WA (US); Hilliard Bruce Siegel, Seattle, WA (US); Jonathan Blair Norwood, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 8 days.

(21) Appl. No.: 14/868,883

(22) Filed: Sep. 29, 2015

(51) Int. Cl.
| | |
|---|---|
| *B60W 40/02* | (2006.01) |
| *B60W 40/08* | (2012.01) |
| *G05D 1/02* | (2006.01) |
| *B60W 50/08* | (2012.01) |
| *G05D 1/00* | (2006.01) |

(52) U.S. Cl.
CPC .......... *G05D 1/0268* (2013.01); *B60W 40/02* (2013.01); *B60W 40/08* (2013.01); *B60W 50/08* (2013.01); *G05D 1/00* (2013.01); *G05D 1/02* (2013.01); *G05D 1/021* (2013.01); *G05D 1/028* (2013.01); *B60W 2040/0809* (2013.01); *B60W 2040/0872* (2013.01); *B60W 2040/0881* (2013.01)

(58) Field of Classification Search
CPC ..... G05D 1/0268; G05D 1/028; B60W 40/08; B60W 2040/0881; B60W 2040/0809; B60W 2040/0872
See application file for complete search history.

(56) References Cited

U.S. PATENT DOCUMENTS

| | | | |
|---|---|---|---|
| 6,504,530 B1 * | 1/2003 | Wilson | G06F 3/0418 345/173 |
| 8,688,306 B1 | 4/2014 | Nemec et al. | |
| 9,147,296 B2 | 9/2015 | Ricci | |
| 9,201,421 B1 * | 12/2015 | Fairfield | B60W 40/04 |
| 9,294,474 B1 | 3/2016 | Alikhani | |
| 2003/0097047 A1 | 5/2003 | Woltermann et al. | |
| 2003/0162523 A1 | 8/2003 | Kapolka et al. | |

(Continued)

FOREIGN PATENT DOCUMENTS

WO    2015134376    9/2015

OTHER PUBLICATIONS

U.S. Appl. No. 14/868,753, filed Sep. 29, 2015, Non-Final Office Action dated Mar. 21, 2017.

(Continued)

*Primary Examiner* — Genna M Mott
(74) *Attorney, Agent, or Firm* — Thomas | Horstemeyer, LLP

(57) ABSTRACT

Disclosed are various embodiments for non-mechanical assistance for autonomous vehicles. An unknown environmental condition may be detected that affects a navigation of the autonomous vehicle. A passenger and/or other source may be presented an inquiry requesting identification of the unknown environmental condition. A response to the inquiry may be used as an input by the vehicle control system in determining appropriate navigation of the autonomous vehicle.

20 Claims, 7 Drawing Sheets

(56) References Cited

U.S. PATENT DOCUMENTS

| | | | |
|---|---|---|---|
| 2006/0178140 A1 | 8/2006 | Smith et al. | |
| 2007/0005609 A1 | 1/2007 | Breed | |
| 2007/0244614 A1 | 10/2007 | Nathanson | |
| 2010/0157061 A1 | 6/2010 | Katsman et al. | |
| 2012/0083960 A1 | 4/2012 | Zhu et al. | |
| 2013/0231824 A1 | 9/2013 | Wilson et al. | |
| 2013/0238170 A1 | 9/2013 | Klinger | |
| 2014/0172290 A1* | 6/2014 | Prokhorov | G01C 21/3602 701/408 |
| 2014/0200737 A1 | 7/2014 | Lortz et al. | |
| 2014/0244678 A1 | 8/2014 | Zamer et al. | |
| 2015/0193005 A1* | 7/2015 | Di Censo | G06F 3/038 345/156 |
| 2015/0291032 A1* | 10/2015 | Kim | B60K 37/06 701/36 |
| 2015/0348112 A1 | 12/2015 | Ramanujam | |
| 2016/0025973 A1* | 1/2016 | Guttag | G02B 27/0101 345/7 |
| 2016/0085565 A1 | 3/2016 | Arcese et al. | |
| 2016/0288796 A1* | 10/2016 | Yuan | B60W 40/08 |

OTHER PUBLICATIONS

U.S. Appl. No. 14/868,753, filed Sep. 29, 2015, Response to Restriction/Election dated Dec. 30, 2016.

U.S. Appl. No. 14/868,753, filed Sep. 29, 2015, Restriction/Election dated Dec. 30, 2016.

* cited by examiner

ENVIRONMENTAL CONDITION IDENTIFICATION ASSISTANCE FOR AUTONOMOUS VEHICLES

CROSS-REFERENCE TO RELATED APPLICATIONS

This application is related to copending U.S. patent application Ser. No. 14/868,753, entitled "Passenger Profiles for Autonomous Vehicles" and filed on even date herewith, which is incorporated by reference herein as if set forth in its entirety. This application is related to copending U.S. patent application Ser. No. 14/868,823, entitled "Event Driven Repurposing of Autonomous Vehicles" and filed on even date herewith, which is incorporated by reference herein as if set forth in its entirety.

BACKGROUND

Vehicles navigate along a route to get from one destination to another. At times a planned route may be affected by an object in the road, road construction, a pedestrian, another vehicle, and/or other type of condition. For example, if an object is in the road, the vehicle may navigate around the object to avoid contact.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to non-mechanical passenger assistance for autonomous vehicles. An autonomous vehicle is a self-driving vehicle that operates on sensor data obtained from the collection and monitoring of sensor inputs (i.e., without user intervention). At times, an autonomous vehicle may detect a condition that is unrecognizable, thereby limiting the capabilities of the autonomous vehicle to proceed along a route. By not understanding the detected condition, the autonomous vehicle may err on the side of caution and stop until the unknown condition is resolved.

For example, the condition may relate to an unknown object and/or obstacle (e.g., pothole, statue, leaves, trash), an unknown intention of a pedestrian near and/or in the intended navigation route, an unrecognizable action associated with an individual near and/or in the intended navigation route redirecting traffic, an unknown stopping location and/or passenger preference (e.g., parking spot, location of a particular individual in a group of individuals), an unknown order in which vehicles can proceed through an intersection, an unknown order of merging vehicles, an unknown terrain, and/or other environmental related conditions. However, passengers may be able to have a better understanding of the environment, thereby allowing a passenger to provide assistance in identifying the unknown condition. Accordingly, by requesting assistance from a passenger and/or other reliable source via an inquiry associated with the unknown condition, the autonomous vehicle may be able to identify the condition and use the response of the passenger and/or other source as an input for current and/or future navigation decisions.

Figure 1:
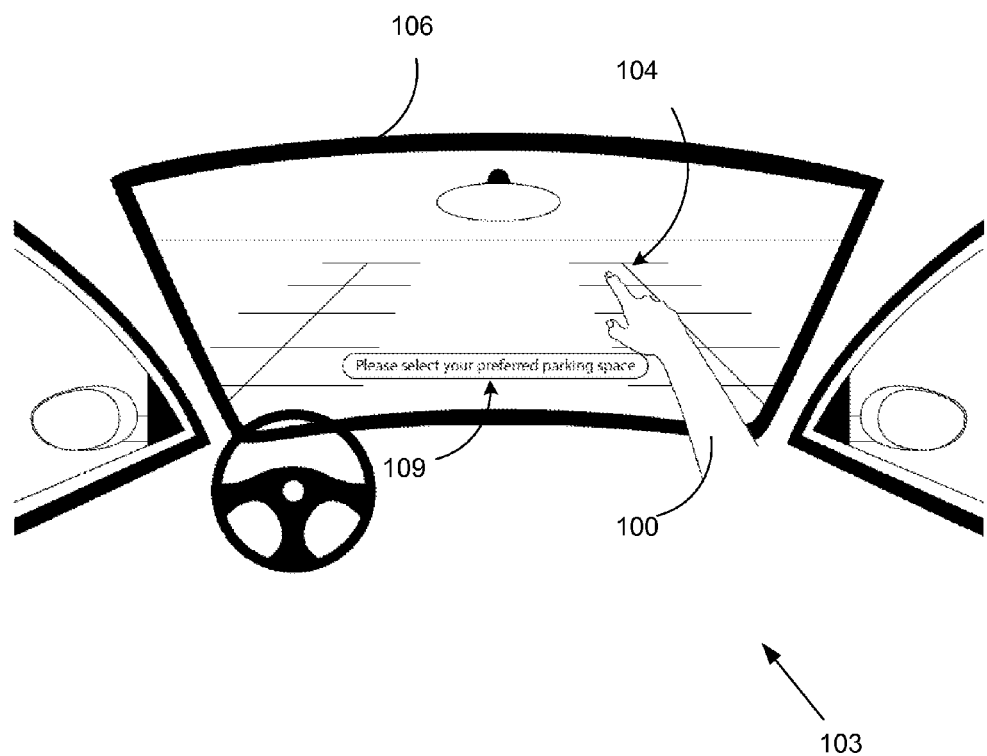
FIG. 1 is a pictorial drawing of an example of a passenger interacting with a user interface displayed in an autonomous vehicle according to various embodiments of the present disclosure.

With reference to FIG. 1, shown is an example of a pictorial representation of a passenger 100 assisting an autonomous vehicle 103 in identifying an unknown condition 104 according to various embodiments of the present disclosure. FIG. 1 illustrates a view of the environment surrounding the front of the vehicle 103 from the interior of the vehicle 103 via the vehicle windshield 106. The detected unknown condition 104 relates to the vehicle 103 being unsure as to where to park the autonomous vehicle 103 given the vast selection of open parking spots. In response to detecting the unknown condition 104, the autonomous vehicle 103 via a controller may generate an inquiry 109 to present to the passenger 100 requesting assistance in making the determination. As shown in FIG. 1, an inquiry 109 asking the passenger 100 to select a preferred parking spot is displayed on the windshield 106. In some embodiments, the inquiry 109 may be displayed via a user interface rendered by a display of the windshield 106. In other embodiments, the inquiry may be projected onto the windshield 106 via a projection device. Additionally, the inquiry 109 may be transparent or semi-transparent such that the view of the environment is not completely obstructed by the display of the inquiry 109.

In FIG. 1, the passenger 100 is shown pointing to a particular location on the windshield 106 indicating a desired parking spot. The vehicle 103 may be able to determine the response of the passenger 100 via a touch command, a gesture, a voice command, and/or any other type of input. In some embodiments, a display of the windshield 106 may include a touch sensor configured to sense the touch of the passenger 100. Accordingly, based at least in part upon the location of the input relative to the locations of the parking spots and/or the field of view of the passenger 100 from inside the vehicle 103, the identified parking spot can be determined. In other embodiments, a camera and/or other sensor may be able to capture images and/or videos of the passenger 100 and apply gesture identifying algorithms to interpret the response by the passenger 100 relative to the view from the windshield 106 and/or the location of the parking spots. Accordingly, the autonomous vehicle 103 may use the response by the passenger 100 as an input in determining in which parking spot to park.

In the following discussion, a general description of the system and its components is provided, followed by a discussion of the operation of the same.

Figure 2:
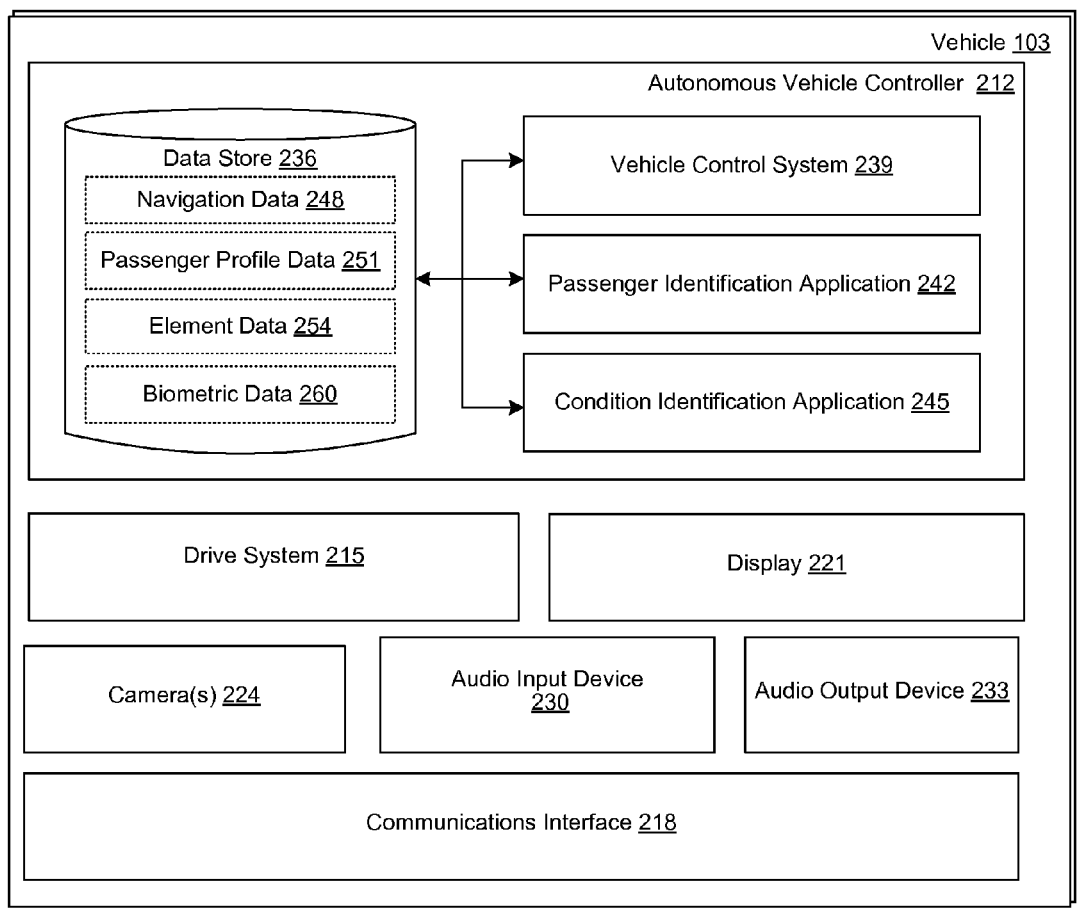
FIG. 2 is a schematic block diagram of the autonomous vehicle of FIG. 1 according to various embodiments of the present disclosure.

Referring next to FIG. 2, shown is an example of a schematic block diagram of the vehicle 103 according to various embodiments of the present disclosure. The vehicle 103 may be embodied as any type of vehicle, including but not limited to cars, trucks, vans, buses, street cars, trains, subways, aircrafts, boats, etc., regardless of how powered or driven. The vehicle 103 may comprise an autonomous vehicle controller 212, a drive system 215, a communications interface 218, a display 221, a camera 224, an audio input device 230, an audio output device 233, and/or other components.

The autonomous vehicle controller 212 may be embodied as analog, digital, or mixed analog and digital processing circuitry and memory that direct the operation of the vehicle 103 and the electromechanical drive system 215 of the vehicle 103. In that sense, the autonomous vehicle controller 212 is an example of an embedded real-time control system in which control outputs are produced in response to control input conditions. The autonomous vehicle controller 212 may include various sensors, such as cameras, laser Illuminated detection and ranging sensors (LIDAR), radar, etc., which may be relied upon to analyze the surroundings and develop control signals for operation of the drive system 215. Among embodiments, the autonomous vehicle controller 212 may perform the processing necessary to direct and operate the vehicle 103 alone or in tandem with other computing systems, including but not limited to the drive system 215, the computing environment 303 (FIG. 3), the client computing device 306 (FIG. 3), and other computing devices and systems. The autonomous vehicle controller 212 may control the maneuvering operations on surface streets, highways, skyways, parking lots, waterways, etc. The autonomous vehicle controller 212 may also interact with passengers 100, third-party entities, and/or computing devices for non-mechanical assistance associated with the navigation of the vehicle 103.

The autonomous vehicle controller 212 is configured to rely upon feedback from its sensors and the drive system 215, for example, to develop an appropriate and suitable route for travel. Among the embodiments, the autonomous vehicle controller 212 may be integrated with the drive system 215 of the vehicle 103 in any suitable manner to permit the vehicle controller 212 to control the operations of the vehicle 103, including but not limited to the acceleration, braking, turning, signal and lamp operation, etc. In that sense, the autonomous vehicle controller 212 may be electrically, mechanically, and electromechanically integrated with the drive system 215 and the other elements of the vehicle 103.

Various applications and/or other functionality may be executed in the autonomous vehicle controller 212 according to various embodiments. Also, various data is stored in the data store 236 that is accessible to the autonomous vehicle controller 212. The data store 236 may be representative of a plurality of data stores 236 as can be appreciated. The data stored in the data store 236, for example, is associated with the operation of the various applications and/or functional entitles described below.

The components executed on the autonomous vehicle controller 212, for example, include a vehicle control system 239, a passenger identification application 242, a condition identification application 245, and/or other applications, services, processes, systems, engines, or functionality not discussed in detail herein. The vehicle control system 239 is executed to control and/or direct the operation of the vehicle 103 via the drive system 215 and/or other components. In addition, the vehicle control system 239 is executed to evaluate feedback from its sensors and the drive system 215, for example, to develop an appropriate and suitable route for travel. In some embodiments, the vehicle control system 239 may identify an unknown condition 104 affecting normal navigation and refer to the condition identification application 245 for identifying the unknown condition 104.

The passenger identification application 242 is executed to identify one or more passengers within the vehicle 103. Additionally, the passenger identification application 242 is executed to determine whether an identified passenger can be considered a reliable source for non-mechanical assistance, such as, for example, identifying an unknown object and/or obstacle (e.g., pothole, statue, leaves, trash), a passenger preference, an intention of a pedestrian near and/or in the intended navigation route, an action associated with an individual near and/or in the intended navigation route redirecting traffic, a stopping location (e.g., parking spot, location of a particular individual in a group of individuals), an order in which vehicles can proceed through an intersection, an order of merging vehicles, an unknown terrain, and/or other environmental related conditions.

A reliable source may be considered a source whose input can be considered as being accurate and/or trustworthy by the autonomous vehicle controller 212. As such, the information supplied by the reliable source may be considered as accurate for identifications of unknown conditions 104. Factors in determining whether a passenger 100 can be considered a reliable source may include, for example, age, competence, capacity, impairment, predefined designation, seat location, vehicle contract designation, vehicle owner, accuracy of prior responses, passenger confirmation, and/or other information.

The condition identification application 245 is executed to identify conditions that may be unknown to the vehicle control system 239. The unknown conditions may comprise, for example, an unknown object and/or obstacle (e.g., pothole, statue, leaves, trash), an unknown intention of a pedestrian near and/or in the intended navigation route, an unrecognizable action associated with an individual near and/or in the intended navigation route redirecting traffic, an unknown stopping location and/or passenger preference (e.g., parking spot, location of a particular individual in a group of individuals), an unknown order in which vehicles can proceed through an intersection, an unknown order of merging vehicles, an unknown terrain, and/or other environmental related conditions.

To determine the unknown condition 104, the condition identification application 245 may generate an inquiry 109 associated with the unknown condition 104 to present to a passenger 100 and/or other identified source. Additionally, the condition identification application 245 may rely on a source to clarify and/or identify the unknown condition 104. The condition identification application 245 may also be configured to communicate with other vehicles 103 and/or computing devices to determine whether the unknown condition has been previously identified.

The data stored in the data store 236 includes, for example, navigation data 248, passenger profile data 251, element data 254, biometric data 260, and potentially other data. The navigation data 248 may comprise sensor data and/or other type of data relied upon for navigation of the vehicle 103, such as street image or view data, roadway data, route data, traffic date, weather data etc. The passenger profile data 251 may comprise information associated with past, current, and/or future passengers of the vehicle 103. The passenger profile data 251 may include information such as age, capabilities, competence, designations (e.g., reliable source, unreliable source, contractual destinations, etc.), impairments, images (e.g. pictures of individual), voice samples, fingerprint/thumbprint/handprint samples, identifier data, and/or other information. In some embodiments, the passenger profile data 251 may be obtained from input data manually entered. In other embodiments, the passenger profile data 251 may be obtained from the computing environment 303, other vehicles 103, and/or other computing devices.

The element data 254 may comprise data associated with the identification of particular objects, obstacles, and/or other types of conditions. For example, the element data 254 may include characteristics about a particular object that may help with the identification of the object. This element data 254 may be used to determine options to present to a passenger and/or other reliable source when inquiring about a particular unknown condition 104. The biometric data 260 may comprise data associated with facial recognition algorithms, voice recognition algorithms, and/or other biometric algorithms. The passenger identification application 242 may access the biometric data 260 when identifying a passenger 100 of the vehicle 103.

The drive system 215 may be embodied as the powertrain and associated electrical, mechanical, electromechanical, control, and diagnostic systems of the vehicle 103. Thus, the drive system 215 may include one or more engines, motors, transmissions, steering, braking, and other systems to control the movement of the vehicle 103 on surface streets, parking lots, etc. As noted above, the drive system 215 operates the vehicle 103 at the direction of the autonomous vehicle controller 212.

Figure 3:
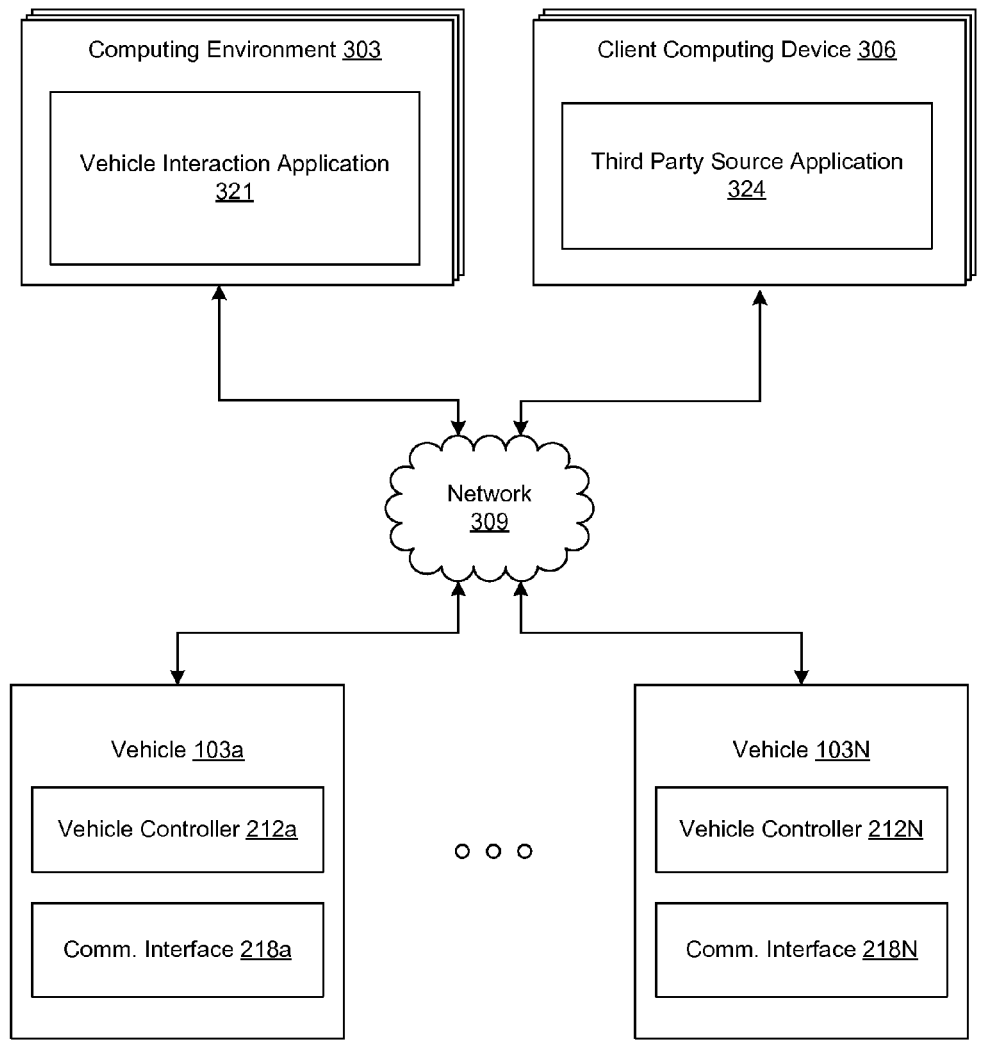
FIG. 3 is a schematic block diagram of a networked environment including the autonomous vehicle of FIGS. 1 and 2 according to various embodiments of the present disclosure.

The communications interface 218 may be embodied as one or more physical layer communications systems and associated software interfaces for communication between the vehicles 103, the computing environment 303 (FIG. 3), the client computing device 306 (FIG. 3), and/or other vehicles 103 via a network 309 (FIG. 3). In that context, the communications interface 218 may include one or more wired or wireless (e.g., cellular, satellite, Wi-Fi®, Bluetooth®, etc.) communications interfaces. Among other data, the communications interface 218 may be relied upon to obtain condition identification information from other vehicles 103, the computing environment 303, the client computing device 306, other computing devices, and/or other sources.

The display 221 may comprise, for example, one or more devices such as liquid crystal display (LCD) displays, gas plasma-based flat panel displays, organic light emitting diode (OLED) displays, LCD projectors, or other types of display devices, etc. In some embodiments, the display 221 may be embedded within the windshield 106 of the vehicle 103. In other embodiments, the display may be affixed to the windshield 106. In other embodiments, the display 221 may comprise a projection device configured to project an inquiry 109 and/or other data onto the windshield 106 and/or other component of the vehicle 103. As such, a generated inquiry may be displayed via the windshield 106 of the vehicle 103, via projection and/or a display, thereby providing a passenger 100 a view of the environment outside of the vehicle 103 along with an inquiry 109 associated with an unknown environmental condition 104. Although the display 221 is discussed relative to the windshield 106 of the vehicle, the location of the display 221 is not to be limited to the vehicle windshield 106.

The cameras 224 may be embodied as one or more image sensors having a field of view within the passenger cabin of the vehicle 103 and/or a field of view outside the vehicle 103. Using the cameras 224, still images and/or video may be relied upon by the autonomous vehicle controller 212 to control the operation of the autonomous vehicle 103, identify unknown conditions encountered by the vehicle 103, identify passengers 100 of the vehicle 103, and/or identify passenger responses to presented inquiries 109. For example, a camera 224 located in the cabin of the vehicle 103 may capture images of one or more passengers 100 which may be analyzed by facial recognition algorithms to identify the one or more passengers 100. In other embodiments, a camera 224 may also have a field of view of the display device 221. Accordingly, the camera 224 may be able to capture images and/or video of a passenger 100 interacting with the display device 221. For example, if the passenger 100 interacts with the autonomous vehicle 103 by touching a particular spot of the windshield 106 based in part on a projection of an inquiry 109, the images and/or video captured by the camera 224 may be processed and analyzed to determine the location of the interaction relative to the screen, thereby determining the intended response of the passenger 100.

The audio input device 230 may comprise a microphone and/or other type of similar sensor that is configured to sense, obtain, and/or record audio data. Specifically, the audio input device 230 can be configured to receive audio inputs which may be parsed and/or analyzed by the autonomous vehicle controller 212. The audio inputs obtained via the audio input device 230 may be used for passenger identification, passenger commands, passenger responses, navigation requests, etc. by the passenger identification application 242, the condition identification application 245, vehicle control system 239, and/or any other application.

The audio output device 233 may comprise a speaker and/or other type of output device. The audio output device 233 can be configured to broadcast audio signals associated with communications and/or other inquiries generated by the autonomous vehicle controller 212. For example, in some embodiments, the condition identification application 245 may present an inquiry 109 regarding an unknown condition 104 via an audio signal broadcasted via the audio output device 233, instead of or in addition to a visual representation of the inquiry 109.

Turning now to FIG. 3, shown is an example of a networked environment 300 according to various embodiments. The networked environment 300 includes a computing environment 303, a client computing device 306, and a plurality of vehicles 103 (e.g., 103a . . . 103N) in data communication with each other via a network 309. The network 309 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 303 may comprise, for example, a server computer or any other system providing computing capability. Alternatively, the computing environment 303 may employ a plurality of computing devices that may be arranged, for example, in one or more server banks or computer banks or other arrangements. Such computing devices may be located in a single installation or may be distributed among many different geographical locations. For example, the computing environment 303 may include a plurality of computing devices that together may comprise a hosted computing resource, a grid computing resource, and/or any other distributed computing arrangement. In some cases, the computing environment 303 may correspond to an elastic computing resource where the allotted capacity of processing, network, storage, or other computing-related resources may vary over time.

Various applications and/or other functionality may be executed in the computing environment 303 according to various embodiments. The components executed on the computing environment 303, for example, include a vehicle interaction application 321, and other applications, services, processes, systems, engines, or functionality not discussed in detail herein. The vehicle interaction application 321 is executed to communicate with the autonomous vehicle controller 212 via the communication interface 218. In some embodiments, the vehicle interaction application 321 may communicate with the vehicle 103 with respect to identifying unknown conditions 104. For example, the vehicle interaction application 321 may notify the vehicle 103 of any prior identifications of the particular unknown condition 104. In some embodiments, the vehicle interaction application 321 can access a database of information stored in the computing environment 303 that is associated with previously identified conditions that may not be recognizable by the vehicle controller 212 of the vehicle 103.

The client computing device 306 is representative of a plurality of client devices that may be coupled to the network 309. The client computing device 306 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability.

The client computing device 306 may be configured to execute various applications such as a third party source application 324 and/or other applications. The third party source application 324 may be executed in a client computing device 306, for example, to access network content served up by the computing environment 303, the vehicle controller 212 via the communication interface 218 of a vehicle 103, and/or other computing device, thereby rendering a user interface on a display or rendering other output, e.g., audio, via associated output devices. To this end, the third party source application 324 may comprise, for example, a browser, a dedicated application, etc., and the user interface may comprise a network page, an application screen, etc.

The third party source application 324 may also be executed to communicate with the vehicle controller 212 via the communications interface 218 with respect to identifying particular unknown conditions 104. For example, client computing device 306 can be associated with a passenger 100 or third-party source that has been determined to be a reliable source for identifying unknown conditions 104.

In some embodiments, the vehicle 103 may not include a passenger 100 and/or may not include a passenger 100 considered to be a reliable source. For example, if the vehicle 103 is being used as a delivery vehicle, the vehicle 103 may not include a passenger. In another non-limiting example, the passenger 100 of the vehicle 103 may not be considered a reliable source due to the age of the passenger 100 and/or other factors. In situations where a reliable source is not present in the vehicle 103a, the vehicle controller 212a may identify a third party source as a reliable source. For example, the client computing device 306 may be associated with an entity specialized in identifying conditions, an owner of the vehicle not present in the car, and/or other type of entity capable of assisting the vehicle 103 with identifying unknown conditions 104. The third party source application 324 may render inquiries 109 related to the identification of the unknown condition 104 by a display device (or other output device) of the client computing device 306, and send responses to the inquiries 109 via interactions with the client computing device 306 to the vehicle controller 212. Additionally, the client computing device 306 may be configured to execute applications beyond the third party source application 324 such as, for example, email applications, social networking applications, word processors, spreadsheets, and/or other applications.

As shown in FIG. 3, each vehicle 103 (e.g., 103a, . . . , 103N) may communicate with each other via the network 309. Collectively, the vehicles may be part of a transportation network allowing the vehicles 103 to communicate information relating to unknown conditions 104 and/or other information. For example, if a particular vehicle 103 detects an unknown condition 104, the vehicle 103 may communicate with one or more vehicles 103 via a respective vehicle controller 212 (e.g., 212a, . . . , 212N) and a respective communications interface 218 (e.g., 218a, . . . , 218N) to determine whether any of the other vehicles 103 have previously identified the unknown condition 104. Additionally, in some embodiments, the vehicles 103 may communicate with each other upon identifying an unknown condition 104. In this manner, a vehicle 103N that has previously identified the unknown condition 104 may act as a reliable source for another vehicle 103a that has posed an inquiry 109 regarding the unknown condition 104.

Figure 4A:
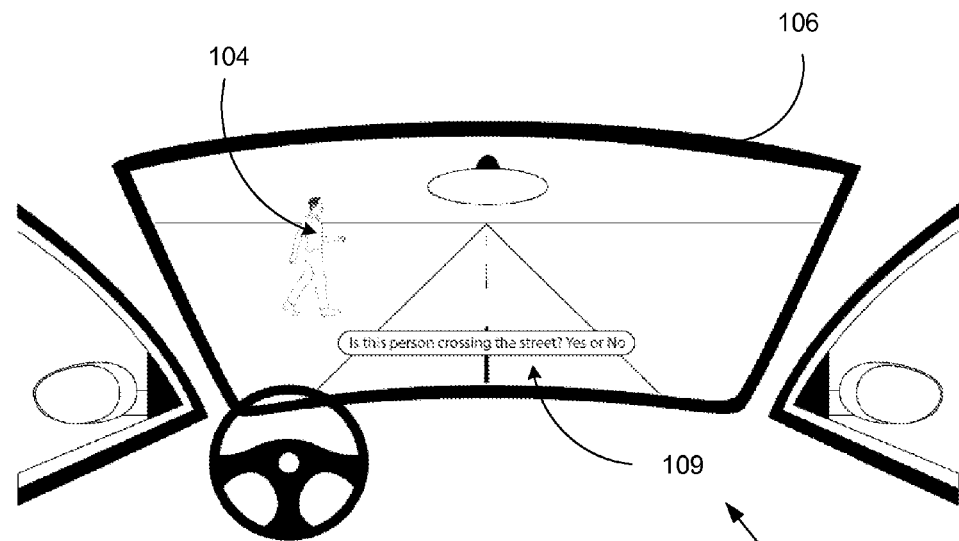
FIGS. 4A and 4B are pictorial drawings of example user interfaces displayed on the autonomous vehicle of FIGS. 1-3 according to various embodiments of the present disclosure.

Referring next to FIG. 4A, shown is an example of a pictorial representation of an inquiry 109 being displayed on a windshield 106 of an autonomous vehicle 103. The inquiry 109 requests a response associated with an unknown condition 104. In this non-limiting example, the unknown condition 104 relates to an unknown intention of the pedestrian. Specifically, the sensors of the autonomous vehicle controller 212 may identify the pedestrian, but may not be able to determine the intention of the pedestrian which may affect vehicle navigation. For example, the autonomous vehicle controller 212 may not be able to determine whether the pedestrian is walking along the side of the road or if the pedestrian is about to walk into the path of the autonomous vehicle 103. Traditionally, an autonomous vehicle may stop until the pedestrian is no longer a concern, e.g., no longer within a particular distance from the autonomous vehicle 103, or no longer within a particular distance from the intended route of the autonomous vehicle 103. However, in this example, the autonomous vehicle controller 212 via the condition identification application 245 has generated an inquiry 109 requesting assistance from the passenger 100 regarding the intentions of the pedestrian.

The passenger 100 may respond to the inquiry 109 via a vocal command, a touch command, a gesture, and/or other type of command. For example, upon display (or other output) of the inquiry 109, the passenger 100 may provide a vocal command which may be received by the condition identification application 245 via the audio input device 230. In another non-limiting example, the inquiry 109, as shown in FIG. 4A, may include proposed answers (e.g., yes/no, list of potential objects, etc.). Accordingly, the passenger 100 may touch the windshield 106 corresponding to the intended response. The condition identification application 245 may be able to determine the intended response via a touch sensor on the display 221 and the display of the inquiry 109 relative to the windshield 106. In another non-limiting example, the passenger 100 may be able to provide a gesture (e.g., head shake, hand wave, etc.) which may be captured via a camera 224 and/or other image capturing device. Accordingly, the condition identification application 245 may analyze the associated data to determine the response of the passenger 100.

Figure 4B:
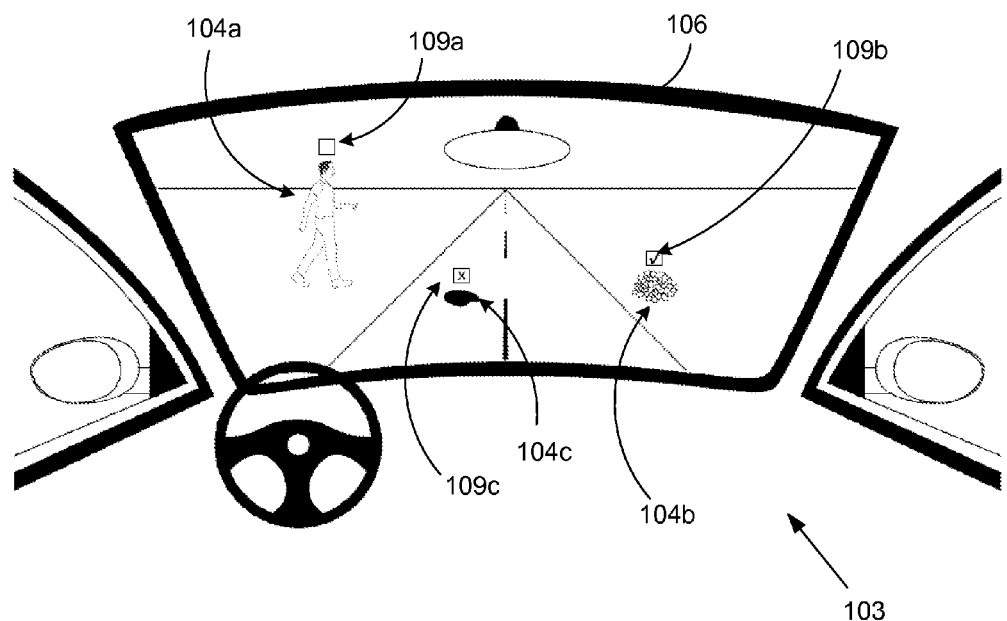

Turning now to FIG. 4B, shown is another example of a pictorial representation of multiple inquiries 109 (e.g., 109a, 109b, 109c) being displayed on a windshield 106 of a vehicle 103 requesting a response associated with a respective unknown condition 104 (e.g., 104a, 104b, 104c). In this example, the inquiries 109 relate to selection components that are displayed relative to a particular unknown condition 104. Specifically, the unknown condition 104a relates to an unknown intention of a person walking, the unknown condition 104b relates to an unknown object on the side of the road, and the unknown condition 104c relates to an unknown object on the road.

In this example, the inquiries 109 may be displayed in the form of selection components displayed on the windshield 106 via a display device (e.g., an embedded display, an affixed display, projection, etc.) relative to each condition 104. A passenger may touch a selection component one or more times to generate the appropriate response. The selection components may be configured to illustrate a positive and/or negative response according to a number of interactions with the selection component for each unknown condition 104. For example, the inquiry 109a corresponding to unknown condition 104a (i.e., pedestrian intention) illustrates an empty box. This may indicate that a response has not yet been received. However, the inquiry 109b corresponding to the unknown condition 104b (i.e., object on side of road) illustrates a box labeled with a checkmark. This may indicate that the unknown condition 104b is not a concern, and the autonomous vehicle 103 can continue on its navigated route along the road. The inquiry 109c corresponding to the unknown condition 104c (i.e., object in the road) illustrates a box labeled with an "X." This may indicate that the unknown condition 104c is a concern, and the autonomous vehicle 103 cannot continue on its navigated route along the road or should attempt to navigate around the obstacle. Specifically, the checkmark may indicate a positive response (e.g., object is not a concern) while the "X" may indicate a negative response (e.g., treat this as an obstacle, etc.). To generate the appropriate responses, a passenger may touch the corresponding selection components until the appropriate response is displayed. It should be noted that while the responses are illustrated in this example as a checkmark and an "X," the responses may be based in part on color, highlighting, and/or other identifying component. For example, the color of the selection component may change based in part on the intended response (e.g., red for a negative response, green for a positive response, etc.). Additionally, the locations of the selection components are not limited to the locations shown in FIG. 4B. For example, a selection component may be shown to surround the entire unknown condition 104 or be displayed at another location relative to the unknown condition 104.

Figure 5:
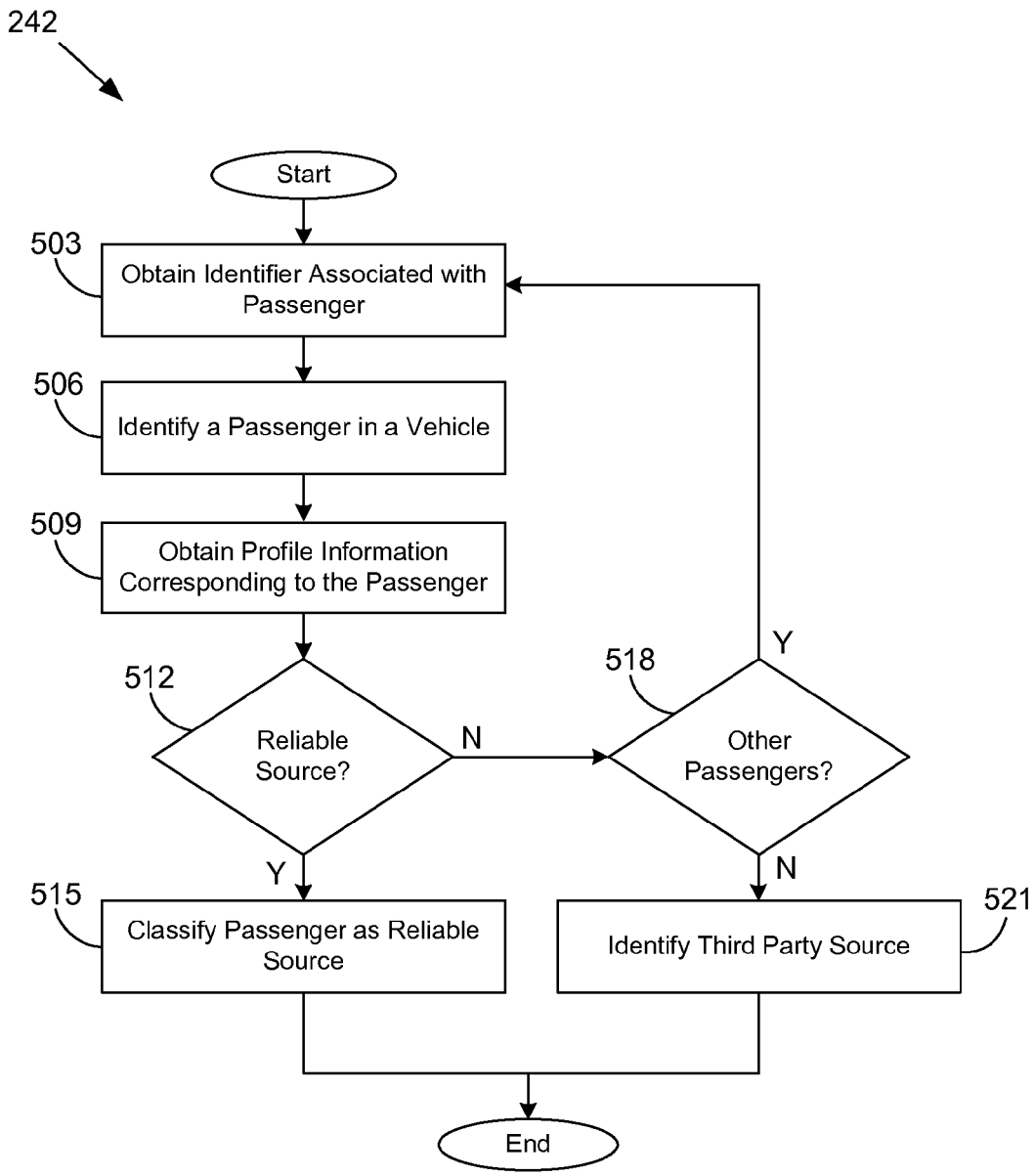
FIG. 5 is a flowchart illustrating one example of functionality implemented as portions of passenger identification application executed in an autonomous vehicle controller of the autonomous vehicle of FIGS. 1-4B according to various embodiments of the present disclosure.

Referring next to FIG. 5, shown is a flowchart that provides one example of the operation of a portion of the passenger identification application 242 according to various embodiments. It is understood that the flowchart of FIG. 5 provides merely an example of the many different types of functional arrangements that may be employed to implement the operation of the portion of the passenger identification application 242 as described herein. As an alternative, the flowchart of FIG. 5 may be viewed as depicting an example of elements of a method implemented in the autonomous vehicle controller 212 (FIG. 2) according to one or more embodiments.

Beginning with box 503, the passenger identification application 242 obtains an identifier associated with a passenger 100. The identifier may comprise an image, a voice sample, a login (e.g., name and/or password), a radio frequency identification (RFID) tag, a personal identification number (PIN) (e.g., card PIN, security token, etc.), a fingerprint, a thumbprint, a handprint, a cellular handshake, and/or any other type of identifier. For example, the identifier may comprise an image of the passenger 100 as captured by a camera 224 configured to capture images and/or videos of the vehicle cabin area. In another non-limiting example, the identifier may comprise a voice sample obtained from the audio input device 230. In another non-limiting example, the display 221 may render a user interface which can receive login information used to identify a passenger 100. In another non-limiting example, the vehicle 103 may comprise a biometric device configured to obtain certain biometric data associated with an individual such as, for example, a fingerprint, a thumbprint, a handprint, a retinal scan, and/or any other type of biometric data.

In box 506, the passenger identification application 242 identifies the passenger 100 according to the identifier. For example, if the identifier comprises an image, the passenger identification application 242 may apply facial recognition algorithms and passenger profile data 251 to identify a particular passenger according to the image. Similarly, if the identifier comprises an audio sample, the passenger identification application 242 may identify the passenger according to analyzing the voice sample using voice recognition algorithms. In some embodiments, the passenger identification application 242 may be able to identify an exact match of the passenger 100 based at least in part on the passenger profile data 251. However, in some embodiments, passenger profile data 251 may be insufficient and/or nonexistent for a particular passenger 100. However, certain characteristics about the passenger 100 (e.g., age, competence, capacity, impairments, etc.) may be determined using facial recognition algorithms, voice recognition algorithms, and/or other biometric algorithms. In some embodiments, if the identifier may comprise a PIN (e.g., card PIN, security token, etc.), a radio frequency identification (RFID) tag, a login and/or other similar type of identifier, the passenger identification application 242 may be able to identify the passenger 100 based at least in part on the unique code and/or pin of the identifier, e.g., with reference to stored associations between identifiers and passengers 100 in the passenger profile data 251.

In some embodiments, the passenger identification application 242 may request confirmation of a proposed identification. For example, the passenger identification application 242 may generate a confirmation request that can be displayed via the display 221 of the vehicle 103 requesting confirmation. In this context, the confirmation request may be projected onto the windshield 106 and/or rendered by a display of the windshield 106, and/or rendered by another display 221 requesting that the passenger 100 confirm the proposed identification. The passenger 100 may confirm and/or deny the proposed identification via an input comprising a touch command (e.g., touch a "yes" on the display and/or projected onto the windshield 106 and/or other location of the vehicle 103), a voice command, a gesture command, and/or other type of interactive command recognizable by the passenger identification application 242 as a response to the confirmation request. In other embodiments, the passenger identification application 242 may generate a confirmation request via an audio signal to be outputted through the audio output device 233. For example, the audio output device 233 may output an audio signal generated to recite "Are you Charlie Ellis?" If the passenger 100 vocally responds to the confirmation request, the passenger identification application 242 may receive the response via the audio input device 230.

In box 509, the passenger identification application 242 may obtain passenger profile data 251 and/or additional information corresponding to the identified passenger 100. The passenger profile data 251 and/or the additional information may be obtained via predefined stored data, inputs provided by the passenger, a device (e.g., mobile phone, RFID tag, flash drive, smart card, etc.) associated with the passenger, and so on. For example, the data store 236 may include predefined passenger profile data 251 associated with the identified passenger 100 when the identified passenger 100 frequently travels in the particular vehicle 103. In another non-limiting example, the passenger 100 may have a device that includes passenger profile information that can be accessed by the passenger identification application 242 via communication between the device and the passenger identification application 242. Accordingly, the profile information can travel with the passenger 100 allowing a vehicle 103 to access information about a passenger 100 who does not typically travel in the particular vehicle 103. In addition, additional characteristics about the passenger 100 such as, for example, age, capacity, competence, impairment, etc., can also be determined via an image and/or voice analysis associated with the identified passenger 100.

In box 512, the passenger identification application 242 determines whether the passenger can be considered a reliable source based at least in part on the passenger profile data 251 and/or other information about the passenger 100. A reliable source is considered a source whose input can be considered as being correct and/or trustworthy. As such, the information supplied by the reliable source may be considered as accurate for identifications of unknown conditions 104.

A source may be considered to be a reliable source according to one or more factors. The factors may include, for example, age, competence, capacity, impairment, predefined designation, seat location, vehicle contract designation, vehicle owner, accuracy of prior responses, passenger confirmation, and/or other information. For example, a particular passenger 100 may be designated to be a reliable source according to his or her passenger profile data 251. In another non-limiting example, passengers 100 may not be considered a reliable source if they are below a threshold age. For example, minors may not be considered reliable sources due to their limited capabilities or experience.

In another non-limiting example, a passenger 100 may be designated as a reliable source according to his or her passenger profile data 251, but an analysis of his or her voice sample, for example, indicates an impairment (e.g., slurring, drowsiness, etc.). The impairment may factor against the individual passenger 100 being considered a reliable source. The passenger identification application 242 may consider one or more of the factors to determine whether the identified passenger 100 is to be considered a reliable source. For example, if the number of factors that are satisfied by the passenger 100 meets or exceeds a predefined threshold, the passenger identification application 242 may determine that the identified passenger 100 is a reliable source. Conversely, if the number of factors fails to meet or exceed the predefined threshold, the passenger identification application 242 may determine that the identified passenger 100 is not a reliable source. In some embodiments, the factors may be weighted according to a level of importance. As such, a weighted sum of factors may be used to determine whether the identified passenger 100 is a reliable source.

In some embodiments, the passenger identification application 242 may request confirmation that the identified passenger 100 is a reliable source. For example, the passenger identification application 242 may generate a confirmation request to be presented to the passenger 100 for confirmation. The confirmation request may be via a user interface presented via the display 221 of the vehicle 103, an audio request sent to the audio output device 233, a user interface transmitted to a display of a mobile device associated with the identified passenger 100, and so on. The identified passenger 100 may send a response, accordingly, confirming or denying that he or she should be considered to be a reliable source.

If the passenger 100 is determined to be a reliable source, the passenger identification application 242 proceeds to box 515. Otherwise, the passenger identification application 242 proceeds to box 518. In box 515, the passenger identification application 242 classifies the identified passenger 100 as a reliable source. As such, the only responses considered by the condition identification application 245 regarding clarifying and/or identifying unknown conditions 104 may be those provided by the identified passenger 100. For example, if there are multiple passengers 100 in the vehicle, the condition identification application 245 will only consider the information provided by the identified passenger 100 based in part on the classification. Upon classifying the identified passenger 100 as the reliable source, the operation of the portion of the passenger identification application 242 ends. Alternatively, two or more passengers 100 may be classified as reliable sources. In such a case, the condition identification application 245 may consider the information provided by the two or more passengers 100 classified as reliable sources in response to inquiries 109 related to unknown conditions 104. In the case of multiple responses to a particular inquiry 109, the condition identification application 245 may require unanimity among the responses, determine a weighted average of the responses, identify a common majority of the responses, or consider only a single response based on a variety of factors, in order to make a determination as to the unknown condition 104.

In box 518, the passenger identification application 242 determines if there are other passengers 100 in the vehicle to consider as a reliable source. If there are other passengers 100, the passenger identification application 242 returns to box 503. Otherwise, the passenger identification application 242 proceeds to box 521.

In box 521, the passenger identification application 242 identifies a third party entity as a reliable source. Accordingly, the third party entity may be another party and/or computing device that can interpret the data associated with the unknown condition 104 and provide a response that can be used as an input by the vehicle control system 239 in determining appropriate navigation. For example, the third party entity may comprise an entity that is familiar with the particular environment associated with the condition, and/or can identify the unknown condition 104 based at least in part on a provided image and/or other information. The third party entity may be associated with the client computing device 306 and may interact with the autonomous vehicle controller 212 via the third party source application 324 executed on the client computing device 306. Upon identifying the third party entity as a reliable source, the operation of the portion of the passenger identification application 242 ends.

Figure 6:
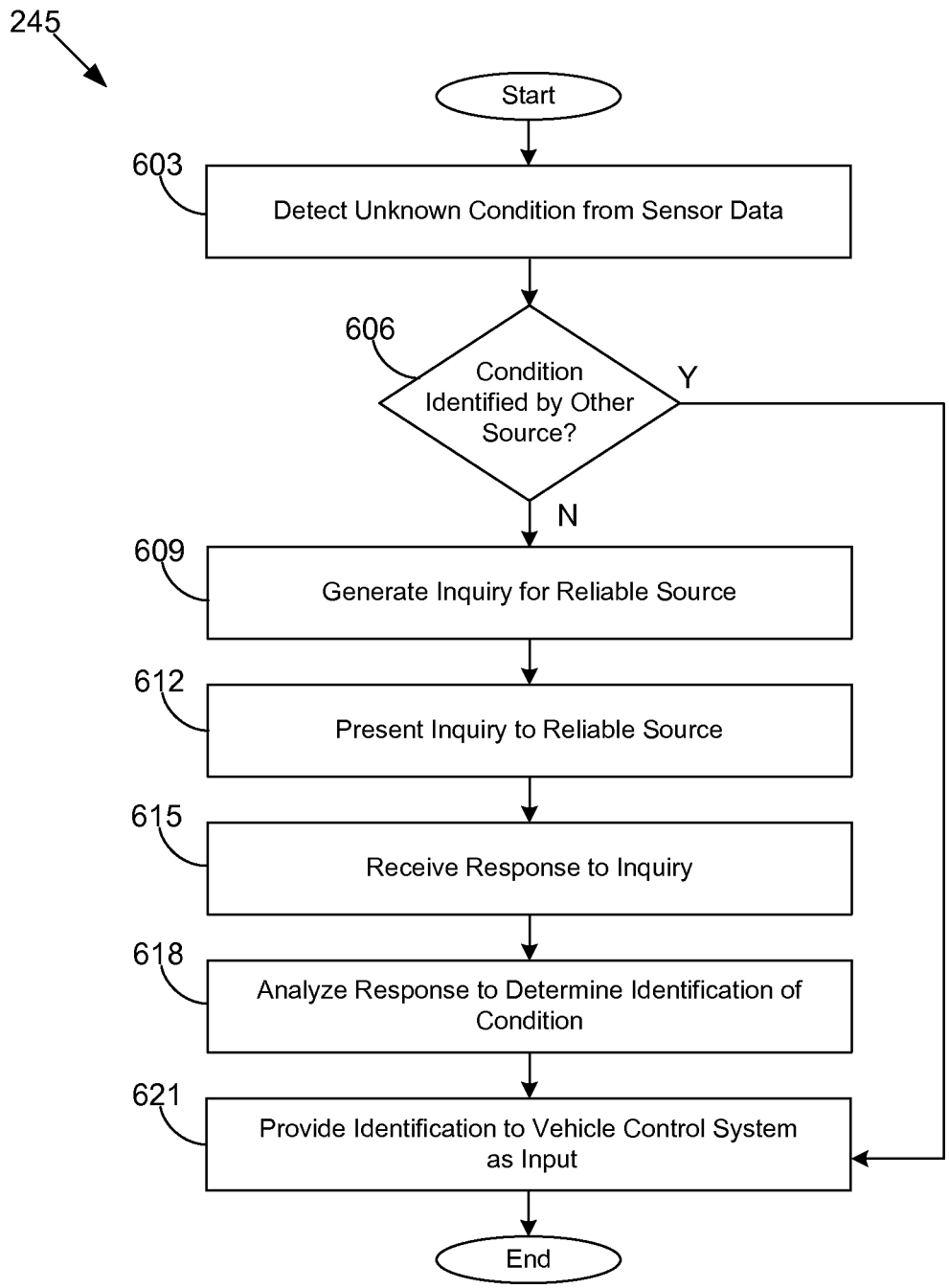
FIG. 6 is a flowchart illustrating one example of functionality implemented as portions of condition identification application executed in an autonomous vehicle controller of the autonomous vehicle of FIGS. 1-4B according to various embodiments of the present disclosure.

Moving on to FIG. 6, shown is a flowchart that provides one example of the operation of a portion of the condition identification application 245 according to various embodiments. It is understood that the flowchart of FIG. 6 provides merely an example of the many different types of functional arrangements that may be employed to implement the operation of the portion of the condition identification application 245 as described herein. As an alternative, the flowchart of FIG. 6 may be viewed as depicting an example of elements of a method implemented in the autonomous vehicle controller 212 (FIG. 2) according to one or more embodiments.

Beginning with box 603, the condition identification application 245 detects an unknown condition 104 from the sensor data. The unknown condition 104 may relate to an unknown object and/or obstacle (e.g., pothole, statue, leaves, trash), an unknown intention of a pedestrian near and/or in the intended navigation route, an unrecognizable action associated with an individual near and/or in the intended navigation route redirecting traffic, an unknown stopping location and/or passenger preference (e.g., parking spot, location of a particular individual in a group of individuals), an unknown order in which vehicles can proceed through an intersection, an unknown order of merging vehicles, an unknown terrain, and/or other environmental related conditions.

The condition identification application 245 may detect the unknown condition 104 via the vehicle control system 239, audio stimuli, visual stimuli, one or more sensors, and so on. For example, as previously discussed, the vehicle control system 239 controls and/or directs the operation of the vehicle 103 via the drive system 215 and/or other components. Specifically, the vehicle control system 239 evaluates feedback from its sensors and the drive system 215, for example, to develop an appropriate and suitable route for travel. If the vehicle control system 239 fails to recognize and/or understand a particular input received from corresponding input sources, the vehicle control system 239 may send a request to the condition identification application 245 requesting identification of the unknown condition 104.

In another non-limiting example, the condition identification application 245 may identify an unknown condition 104 in response to visual stimuli such as a passenger reaction indicating urgency and/or distress, for example. In another non-limiting example, the condition identification application 245 may identify an unknown condition 104 in response to identifying particular words and/or tones associated with audio signals of the passengers received via the audio input device 230. For example, if the condition identification application 245 detects an elevated tone and the word "stop" or "watch out," the condition identification application 245 may detect a condition that it had not previously considered. As such, the passenger 100 may be able to notify the vehicle controller 212 via visual and/or audio cues of a hazard and/or other unknown environmental condition 104 that the vehicle controller 212 failed to previously identify.

In box 606, the condition identification application 245 determines whether the unknown condition 104 has been identified by another source. For example, the condition identification application 245 may communicate with one or more other vehicles 103 in the vehicle network to determine whether any of the other vehicles 103 has already identified the unknown condition 104. If the unknown condition 104 relates to a pothole in the road, and the condition identification application 245 wants to verify that the unknown object is in fact a pothole, the condition identification application 245 may reach out to the other vehicles 103 to determine if any of the other vehicles 103 have identified the object as a pothole.

In some embodiments, the condition identification application 245 may determine that the unknown condition 104 has been previously identified by another source if another vehicle contains a record of previously identifying the unknown condition 104. In other embodiments, the condition identification application 245 may determine that the unknown condition 104 is to be identified by another source if a predefined threshold number of vehicles 103 have previously identified the unknown condition 104.

In other embodiments, the other source may relate to the computing environment 303. As such, the condition identification application 245 may communicate with the vehicle interaction application 321 to determine if there is any indication according to data stored in the data store of the computing environment 303 that the unknown condition 104 has been identified. For example, the vehicle interaction application 321 may be able to access a database of information associated with previously identified conditions that may not be recognizable by the vehicle controller 212 of the vehicle 103. If the unknown condition 104 has been identified by another source, the condition identification application 245 proceeds to box 621. Otherwise, the condition identification application 245 proceeds to box 609.

In box 609, the condition identification application 245 generates an inquiry 109 to present to the reliable source with respect to the unknown condition 104. In some embodiments, the condition identification application 245 generates a user interface comprising the inquiry 109 to be rendered by the display 221. The condition identification application 245 may generate the user interface such that the inquiry is highlighted in a particular manner to notify the user of the pending inquiry. For example, the inquiry 109 may be displayed in a pulsing manner. In another embodiment, the audio output device 233 may broadcast a sound or alert that notifies the passenger 100 of the inquiry 109 being displayed.

In other embodiments, the condition identification application 245 may generate an audio signal of the inquiry 109 to be output via the audio output device 233. For example, the audio signal may be generated to ask the passenger 100 to identify and/or clarify a particular unknown condition 104. In some embodiments, the audio signal may direct the passenger 100 to look in a certain location of the surrounding environment to focus on the unknown condition 104.

In other embodiments, the inquiry 109 may comprise a question as illustrated in FIGS. 1 and 4A. In other embodiments, as shown in FIG. 4B, the user interface may highlight the unknown condition 104 and provide a component for selection with respect to clarification and/or identification of the unknown condition 104. In some embodiments, the inquiry 109 may include proposed responses. For example, if the unknown condition 104 relates to an unknown object, the condition identification application 245 may evaluate particular characteristics about the object and guess potential identifications. In this example, the potential identifications may be determined via image recognition algorithms, the element data 254, learned data associated with prior responses, and/or other information or algorithms. Using the characteristics about the object and the additional data, the condition identification application 245 may determine the potential identifications to present in the inquiry 109. As such, in one non-limiting example, the inquiry 109 may ask whether the identified object is "a pile of leaves or a pile of rocks." Accordingly, the condition identification application 245 may inquire about particular objects/conditions in order to correctly tag and/or record data associated with the object/condition for future identifications.

In box 612, the condition identification application 245 presents the inquiry 109 to the reliable source. For example, if the inquiry 109 is included in a user interface, the inquiry 109 may be rendered by the display 221. In some embodiments, the display 221 may be embedded within the windshield 106 of the vehicle 103. In other embodiments, the display 221 may be affixed to the windshield 106 and/or other component of the vehicle 103. The user interface may comprise transparent or semi-transparent components such that the view of the environment is not compromised by the rendered inquiry 109. In other embodiments, the inquiry 109 may be projected by a display 221 (e.g., projection device). The projection device may project the inquiry 109 onto the windshield 106 of the vehicle 103 and/or other portion of the vehicle 103.

In other embodiments, the inquiry 109 may be presented to the passenger 100 via an audio signal that is broadcasted via the audio output device 233. Accordingly, the inquiry 109 may direct the passenger 100 to a particular location in the surrounding environment that relates to the unknown condition 104. For example, if there is a flagger in a construction zone that is directing traffic, the inquiry 109 may ask for the passenger 100 to identify the flagger and notify the vehicle controller 212 how the vehicle 103 should proceed.

In box 615, the condition identification application 245 receives a response to the inquiry 109. In some embodiments, the passenger 100 may provide a response by selecting a proposed response included in the inquiry 109. For example, if the inquiry 109 is presented to the passenger 100 via a user interface rendered by a display 221 of the windshield 106, the passenger 100 may be able to select via an input device and/or via a touch sensor, a particular selection. In other embodiments, the passenger 100 may touch, select, and/or gesture to a particular location of the display 221 and/or projected interface to select a response. The vehicle 103 may include a camera 224 and/or other type of device to identify an intended selection for a response relative to the display 221, windshield 106, and/or surrounding environment. In other embodiments, the condition identification application 245 may receive a response to the inquiry 109 via the audio input device 230. For example, the passenger 100 may use vocal commands to respond to the inquiry 109.

In box 618, the condition identification application 245 analyzes the response to determine an identification of the unknown condition 104. In one non-limiting example, the condition identification application 245 may analyze the response to determine if the response was provided by the passenger 100 considered to be the reliable source. This may be determined based in part on an image, a biometric, a location of the passenger providing the response, a voice analysis, etc. Additionally, the response may be analyzed to determine the intended response. In one non-limiting example, the condition identification application 245 may analyze an audio signal received via the audio input device 230 to determine the response of the passenger 100. In another non-limiting example, the condition identification application 245 may analyze a position of a touch by the passenger 100 on the windshield/display relative to the field of view and display size to determine the intended response of the passenger 100.

In box 621, the condition identification application 245 provides the identification of the unknown condition 104 to the vehicle control system 239. The vehicle control system 239 may consider the identified condition as an input in determining appropriate navigation and/or operation of the vehicle 103. Upon providing the identified condition to the vehicle control system 239, the operation of the portion of the condition identification application 245 ends.

Figure 7:
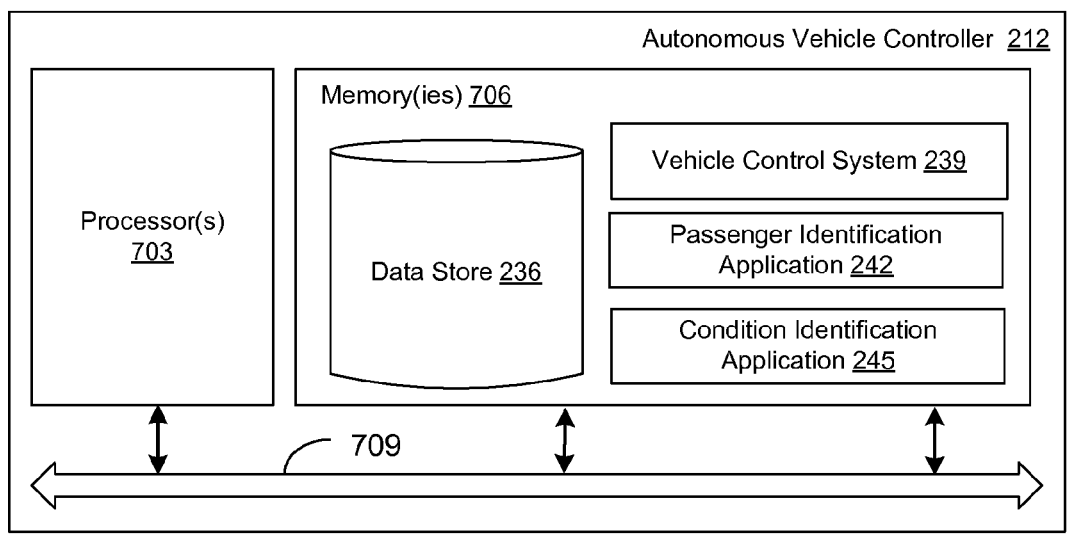
FIG. 7 is a schematic block diagram that provides one example illustration of an autonomous vehicle controller employed in the vehicle of FIGS. 1-4B according to various embodiments of the present disclosure.

With reference to FIG. 7, shown is a schematic block diagram of the autonomous vehicle controller 212 according to an embodiment of the present disclosure. The autonomous vehicle controller 212 includes at least one processor circuit, for example, having a processor 703 and a memory 706, both of which are coupled to a local interface 709. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the vehicle control system 239, the passenger identification application 242, the condition identification application 245, and potentially other applications. Also stored in the memory 706 may be a data store 236 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the vehicle control system 239, the passenger identification application 242, the condition identification application 245, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 5 and 6 show the functionality and operation of an implementation of portions of the passenger identification application 242 and the condition identification application 245, respectively. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 5 and 6 show a specific order of execution, it is understood that the order of execution may differ from that which is depicted. For example, the order of execution of two or more blocks may be scrambled relative to the order shown. Also, two or more blocks shown in succession in FIGS. 5 and 6 may be executed concurrently or with partial concurrence. Further, in some embodiments, one or more of the blocks shown in FIGS. 5 and 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the vehicle control system 239, the passenger identification application 242, and the condition identification application 245, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the vehicle control system 239, the passenger identification application 242, and the condition identification application 245, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same autonomous vehicle controller 212, or in multiple vehicle controllers in the same vehicle 103.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications Therefore, the following is claimed:

1. A system, comprising:
an autonomous vehicle; and
a controller configured to control operation of the autonomous vehicle, the controller being further configured to perform a method comprising:
identifying a plurality of passengers of the autonomous vehicle based at least in part on at least one of an image, an audio signal, a fingerprint, a handprint, a user login, a personal identification number (PIN), or a radio frequency identification (RFID) tag;
generating a respective score for individual passengers of the plurality of passengers based at least in part on a sum of a plurality of weights assigned to a plurality of factors, the plurality of factors including at least one of an age, a level of impairment, a passenger confirmation received from at least one passenger of the plurality of passengers, or an accuracy of prior responses, individual factors being weighted with a different weight of the plurality of weights;
selecting a master passenger from the plurality of passengers based at least in part on the respective score of the master passenger, wherein information provided by the master passenger is considered accurate by the controller;
detecting an unknown environmental condition affecting navigation of the autonomous vehicle;
determining a plurality of potential options for an identification of the unknown environmental condition;
generating a user interface including an inquiry related to an identification of the unknown environmental condition, wherein the inquiry includes the plurality of potential options;
presenting the user interface via a display of a windshield of the autonomous vehicle;
receiving a response to the inquiry via an input to the user interface, the response including a selection of a particular option of the plurality of potential options;
verifying that the master passenger provided the response based at least in part on a combination of a plurality of indicators comprising at least one of a biometric, the RFID tag, a voice analysis, or a seat location; and
determining a specific navigation for the autonomous vehicle based at least in part on the identification of the unknown environmental condition and a verification that the master passenger provided the response.

2. The system of claim 1, wherein the unknown environmental condition comprises at least one of a passenger preference, an unknown intention of a pedestrian, an unrecognizable action associated with an individual positioned within an intended navigation route, an unknown order for proceeding through an intersection, or an unknown merging order.

3. The system of claim 1, wherein the controller is further configured to perform the method further comprising communicating with at least one other autonomous vehicle to determine whether the at least one other autonomous vehicle has previously identified the unknown environmental condition.

4. A system, comprising:
an autonomous vehicle; and
a controller configured to control navigation of the autonomous vehicle, the controller further being configured to perform a method comprising:
detecting an unknown environmental condition limiting an ability to navigate the autonomous vehicle based at least in part on at least one of a visual stimulus or an audio stimulus, the at least one of the visual stimulus or audio stimulus occurring from within the autonomous vehicle;
generating an inquiry requesting assistance in identifying the unknown environmental condition;
presenting the inquiry to a plurality of sources;
receiving a plurality of responses to the inquiry, the plurality of responses including an identification of the unknown environmental condition;
verifying that the plurality of responses were received from a plurality of reliable sources, individual reliable sources of the plurality of reliable sources being identified based at least in part on a combination of a plurality of indicators comprising at least one of a biometric, a radio frequency identification (RFID) tag, a voice analysis, or a seat location;
verifying the identification based at least in part on at least one of a unanimity of the plurality of responses, a weighted average associated with the plurality of responses, or a majority of the plurality of responses; and
determining a specific navigation for the autonomous vehicle based at least in part on the identification in response to verifying the identification.

5. The system of claim 4, wherein the unknown environmental condition comprises at least one of an unknown object, an unknown obstacle, a passenger preference, construction, an unknown intention of a pedestrian, an unrecognizable action associated with an individual compromising an intended navigation route, an unknown stopping location, an unknown order for proceeding through an intersection, an unknown merging order, or an unknown terrain.

6. The system of claim 4, wherein the controller is further configured to perform the method further comprising communicating with another autonomous vehicle to determine whether the other autonomous vehicle has identified the unknown environmental condition.

7. The system of claim 4, wherein the plurality of reliable sources comprise a plurality of selected passengers of the autonomous vehicle, the plurality of selected passengers being selected from a plurality of passengers in the autonomous vehicle to be the reliable sources based at least in part on a respective score generated by a sum of weights assigned to a plurality of factors comprising at least one of an age, a competence, an accuracy of prior responses, a passenger confirmation, or a level of impairment.

8. The system of claim 4, wherein at least one reliable source of the plurality of reliable sources is a third party entity, and wherein presenting the inquiry to the plurality of sources further comprises transmitting the inquiry over a network to a client computing device associated with the third party entity, the inquiry to be presented via the client computing device.

9. The system of claim 4, wherein presenting the inquiry to the plurality of sources comprises rendering the inquiry via a display device of the autonomous vehicle.

10. The system of claim 9, wherein the display device is embedded within a windshield of the autonomous vehicle.

11. The system of claim 9, wherein the display device is a projection device configured to project the inquiry onto a surface of the autonomous vehicle.

12. The system of claim 4, wherein the autonomous vehicle comprises a plurality of touch sensors embedded within a windshield of the autonomous vehicle, and at least one response is received via a particular touch sensor of the plurality of touch sensors.

13. A method, comprising:
    detecting, via an autonomous vehicle controller, an unknown environmental condition based at least in part on sensor data received from a plurality of sensors associated with an autonomous vehicle controlled by the autonomous vehicle controller, the unknown environmental condition limiting an ability to navigate the autonomous vehicle;
    generating, via the autonomous vehicle controller, an inquiry related to determining identification of the unknown environmental condition, the inquiry including a plurality of potential identifications of the unknown environmental condition;
    rendering, via the autonomous vehicle controller, the inquiry via a display of the autonomous vehicle;
    receiving, via the autonomous vehicle controller, a plurality of responses to the inquiry, individual responses of the plurality of responses including a respective identification of the plurality of potential identifications of the unknown environmental condition;
    verifying, via the autonomous vehicle controller, that the plurality of responses were received from a plurality of reliable sources based at least in part on a combination of a plurality of indicators comprising at least one of a biometric, a personal identification number (PIN), a radio frequency identification (RFID) tag, a voice analysis, or a seat location;
    determining a particular identification of the unknown environmental condition based at least in part on at least one of a unanimity of the plurality of responses, a weighted average of the plurality of responses, or a majority of the plurality of responses; and
    determining, via the autonomous vehicle controller, a specific navigation for the autonomous vehicle based at least in part on the determination of the particular identification.

14. The method of claim 13, wherein the unknown environmental condition comprises at least one of an unknown object, an unknown obstacle, a passenger preference, construction, an unknown intention of a pedestrian, an unrecognizable action associated with an individual positioned relative to an intended navigation route, an unknown stopping location, an unknown order for proceeding through an intersection, an unknown merging order, or an unknown terrain.

15. The method of claim 13, further comprising identifying, via the autonomous vehicle controller, a passenger of the autonomous vehicle based at least in part on at least one of an image, an audio signal, a fingerprint, a handprint, a user login, the personal identification number (PIN), or the radio frequency identification (RFID) tag.

16. The method of claim 15, further comprising determining, via the autonomous vehicle controller, that the passenger is considered a reliable source based at least in part on a sum of a plurality of weights assigned to a plurality of factors comprising at least one of an age, an accuracy of prior responses, a passenger confirmation, or a level of impairment, individual factors being weighted with a different weight of the plurality of weights, and the autonomous vehicle controller configured to consider information provided by the reliable source as accurate.

17. The method of claim 15, wherein at least one response is a gesture response, the gesture response being detected via an imaging device of the autonomous vehicle.

18. The method of claim 15, wherein at least one response is a verbal response, the verbal response being received via an audio input device of the autonomous vehicle.

19. The method of claim 13, further comprising:
    generating an audio alert associated with the inquiry; and
    broadcasting the audio alert via an audio output device of the autonomous vehicle in addition to rendering the inquiry via the display to notify a passenger of the autonomous vehicle of the inquiry, the audio alert being separate from the inquiry.

20. The method of claim 13, wherein the display further comprises a plurality of touch sensors embedded within a windshield, at least one response being received via a particular touch sensor.

* * * * *